United States Patent [19]
Moertel

[11] 4,139,938
[45] Feb. 20, 1979

[54] APPARATUS FOR MAKING SLIDE FASTENERS

[75] Inventor: George B. Moertel, Conneautville, Pa.

[73] Assignee: Textron Inc., Providence, R.I.

[21] Appl. No.: 660,545

[22] Filed: Feb. 23, 1976

Related U.S. Application Data

[62] Division of Ser. No. 579,982, May 22, 1975, Pat. No. 3,964,150, which is a division of Ser. No. 289,852, Sep. 18, 1972, Pat. No. 3,885,276.

[51] Int. Cl.² .......................... B21D 53/52; B29D 5/00
[52] U.S. Cl. ....................................................... 29/766
[58] Field of Search ................. 29/408, 207.5 R, 766; 24/205.16 R, 205.16 C, 205.1 C; 139/384 B, 384 R

[56] References Cited

U.S. PATENT DOCUMENTS

| | | | |
|---|---|---|---|
| 2,651,092 | 9/1953 | Poux | 24/205.16 R |
| 2,942,338 | 6/1960 | Burbank | 29/408 |
| 3,711,903 | 1/1973 | Brown | 24/205.16 R X |
| 3,836,413 | 9/1974 | Frohlich et al. | 29/408 X |

Primary Examiner—E. M. Combs

[57] ABSTRACT

A slide fastener and method and apparatus for making the same is disclosed wherein the slide fastener chain includes a pair of carrier tapes with interlocking elements on adjacent edges thereof and portions of the tapes are compacted to constitute strips or bands arresting fiber slippage of the tape fabrics.

8 Claims, 8 Drawing Figures

U.S. Patent   Feb. 20, 1979   Sheet 1 of 3   4,139,938
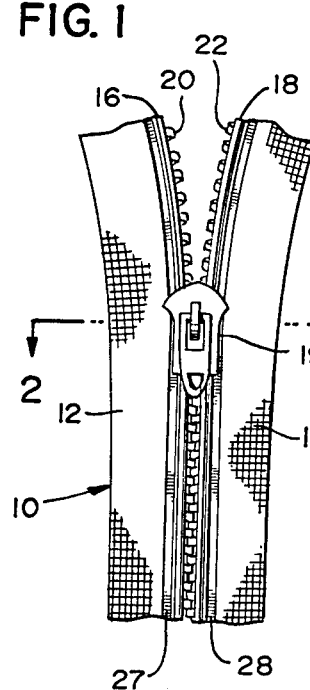
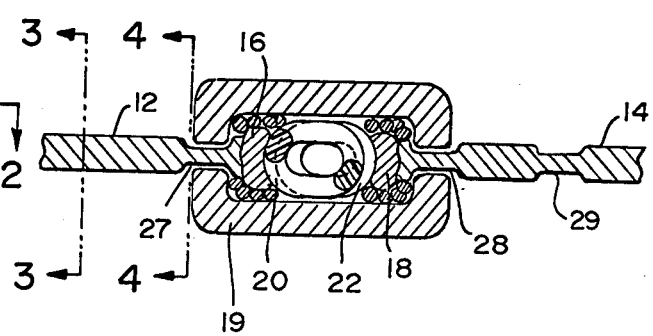
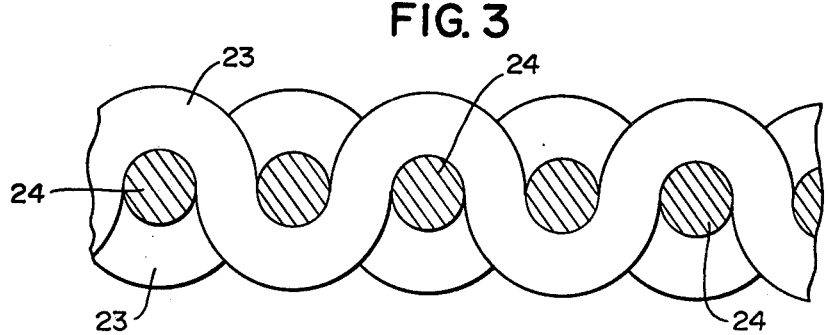
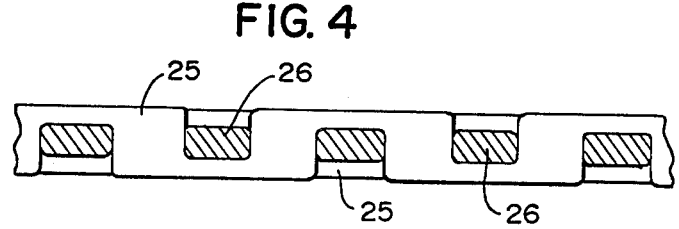

APPARATUS FOR MAKING SLIDE FASTENERS

CROSS REFERENCE TO RELATED APPLICATION

This is a divisional application of pending application Ser. No. 579,982 filed May 22, 1975, (now U.S. Pat. No. 3,964,150 dated June 22, 1976) as a first divisional application of parent application Ser. No. 289,852 filed Sept. 18, 1972 (now U.S. Pat. No. 3,885,276 dated May 27, 1975).

BACKGROUND OF THE INVENTION

1. Field of the Invention

The present invention relates to slide fasteners and to a method and apparatus for making the same, and, more particularly, to the construction of chain for such slide fasteners.

2. Description of the Prior Art

Conventional slide fastener devices have long been encumbered with the problems of wear caused by abrasion between the slider and carrier tapes, of binding between the slider and interlocking elements, and of lateral stress on the chain caused by the wearer of a garment in which the slide fastener device is installed.

U.S. Pat. No. 1,947,508 is representative of the prior art in illustrating a fabric for the tapes of a slide fastener woven to present a flexible cord of reduced cross section between the bead and the flat section of the tape; however, reduction of such cord thickness is accomplished by variations in the particular weave of the fabric, which still permits fiber slippage when the fabric threads are laterally stressed.

None of the prior art devices contain any recognition and/or solution of the condition known as fiber slippage which occurs when tensile loading is applied to the textile matrix of the slide fastener chain. This condition causes stretching and separation of the threads forming the fabric of the chain tapes and results in faulty operation of the slide fastener as well as a reduction of the normal life of the slide fastener.

SUMMARY OF THE INVENTION

The present invention is summarized in that a slide fastener is constructed so as to include a pair of carrier tapes, an edge portion on each carrier tape with such edge portions being oppositely disposed to each other, interlocking elements on each edge portion with the interlocking elements on one edge portion adapted to be engaged and disengaged with the interlocking elements on the other edge portion, and compacted portions on said carrier tapes forming channelized sections extending longitudinally with and spaced from the edge portions.

An object of the present invention is to reduce the wear and binding of the components of a slide fastener.

Another object of this invention is to construct the chain of a slide fastener with compacted portions disposed parallel to the edges of the chain tapes.

It is another object of this invention to rearrange the textile matrix on portions of tapes on a slide fastener chain.

The present invention has another object in that portions of the warp and weft threads of the tapes on a slide fastener are compacted into an interlocking arrangement.

This invention has another object in that the tapes of a slide fastener chain are provided with barrier strips to arrest fiber slippage of the tape fabrics.

Another object of the present invention is to make a slide fastener chain by ultrasonically hammering portions of the chain against an anvil to arrange the textile matrix thereof into an interlocked network.

It is another object of the present arrangement to construct apparatus for making slide fastener chain with a chain feeding mechanism and with an ultrasonic device for deforming the feed chain.

Still a further object of this invention is to provide a slide fastener chain making apparatus with anvil and hammering elements and with a guide element protecting the interlocking elements of the slide fastener.

Other objects and advantages of the present invention will become apparent from the following description taken in conjunction with the accompanying drawings.

BRIEF DESCRIPTION OF THE DRAWINGS

FIG. 1 is a partial plan view of a slide fastener embodying the present invention.

FIG. 2 is an enlarged cross section taken along line 2—2 of FIG. 1 with a detail added;

FIG. 3 is an enlarged sectional view of a detail taken along line 3-3 of FIG. 2;

FIG. 4 is an enlarged sectional view of another detail taken along line 4—4 of FIG. 2;

DESCRIPTION OF THE PREFERRED EMBODIMENT

Figure 5:
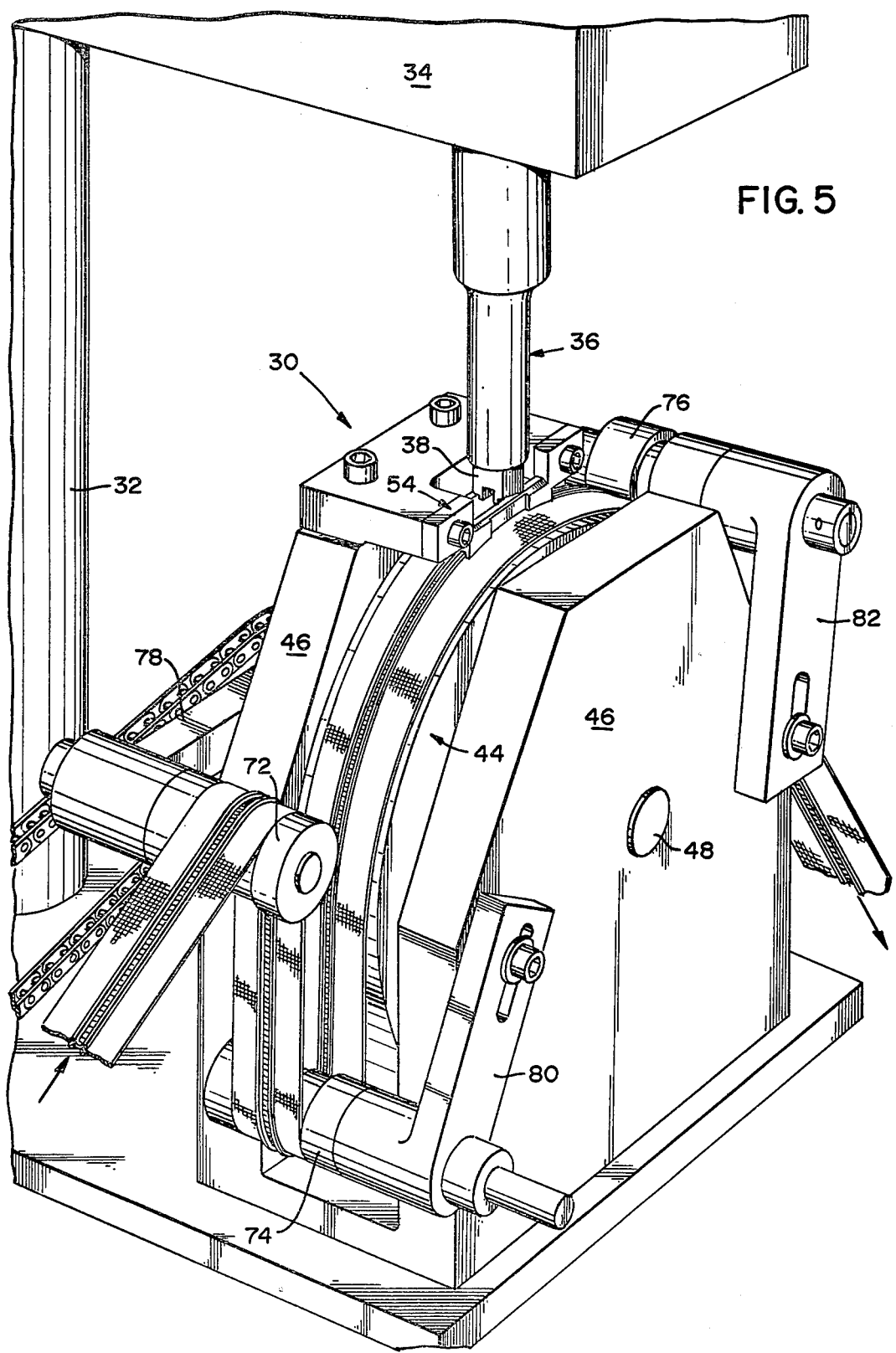
FIG. 5 is a partial perspective view of apparatus embodying the present invention.

As is illustrated in FIG. 1, the present invention is embodied in a slide fastener, indicated generally at 10, including a pair of carrier tapes 12 and 14 with longitudinally extending edges 16 and 18, respectively. A conventional slider 19 is longitudinally moved for engaging and disengaging a series of interlocking elements 20 and 22 secured to the tape edges 16 and 18, respectively. The interlocking elements 20 and 22 may be made of any suitable material such as metal or plastic; in connection with the present invention, the elements 20 and 22 have been made of Nylon material with each set 20 (or 22) being formed of a continuous filament and each interlocking element having a coiled configuration. In one particular slide fastener constructed according to the present invention, the tape edges 16 and 18 were defined by cords or beads which are enlarged in cross-section relative to thickness of the carrier tapes 12 and 14.

The carrier tapes 12 and 14 have identical components, so only one tape will be described in detail. While the tape 12 may be knitted, sewn or woven, the textile matrix of a woven tape section is illustrated in FIG. 3 wherein the carrier tape 12 may be made of any suitable material such as plastic and/or cotton threads; e.g., a plastic material such as Nylon or a polyester may be used solely or in a blend with natural fibers. In one particular construction embodying the present invention, warp threads were made of Nylon and weft or filler threads were made of cotton.

As is shown in FIG. 3, the major portion of the woven carrier tape 12 includes warp threads 23 interlaced on weft threads 24; upon completion of the weaving operation the warp threads 23 have a generally sinuous, semi-circular configuration while the weft threads 24 are circular in cross-section. Minor portions of the warp and weft threads 22 and 24 are compacted into noncircular configurations; as is shown in FIG. 4, the non-circular warp threads 25 form a generally rectangular zig-zag configuration while the non-circular weft threads 26 are generally rectangular in cross-section. The non-circular warp and weft threads 25 and 26 are thus flattened or reduced in thickness to define a compacted portion forming a channelized section 27 on the carrier tape 12, with a similar channelized section 28 shown on the other carrier tape 14 in FIGS. 1 and 2. The channelized sections 27 and 28 are located adjacent the tape edges 16 and 18, respectively, and extend longitudinally therewith (see FIG. 1) for the length of the slide fastener 10.

Since the channelized sections 27 and 28 are compacted toward their central areas, each such section defines a front and a rear channel in which the front and rear side flanges of the slider 19 are slidably disposed. As is apparent from FIG. 2, the side flanges of the slider 19 are disposed in channels of the tapes 12 and 14 and are slidably movable therealong without binding interference between the slider and the tapes.

The channelized tapes have the particular advantages of eliminating the need for close tolerances between the side flanges of the slider whereby manufacturing costs are reduced, and of assuring closure of the interlocking elements 20 and 22 during slider movement. In addition, the channelized sections 27 and 28 present increased bearing area for the inner surfaces of the slider side flanges, so that any contact therebetween subjects the slide fastener to only minimal unit pressure whereby the operational and life characteristics of the slide fastener are increased.

In accordance with the present invention, the warp and weft threads 25 and 26 are interlocked with each other and thereby have a higher resistance to fiber slippage than is possible with undeformed warp and weft threads of the type shown in FIG. 3. Thus the channelized sections 27 and 28 serve as barriers to prevent excessive slippage of the fibers. The importance of this feature becomes apparent when the slide fastener is subject to high lateral stress as occurs when the garment is undersized for the wearer and/or when the wearer stretches the garment by stooping, exercising or the like. Such high lateral stress would cause separation of the yarns in the textile matrix as shown in FIG. 3; however, by altering the physical engagement of the yarns to the interlocked matrix as shown in FIG. 4, any relative movement between the yarns is greatly restricted at the lateral stress levels normally encountered by action of the garment in which the slide fastener is installed.

The compacted channelized sections 27 and 28 constitute longitudinal bands serving as barriers to prevent excessive fiber slippage of chain tapes and related slide fastener failure. While such barrier bands are illustrated as elongated rectangular strips in plan view, it is to be understood that other configurations and/or patterns may be utilized, for example, such elongated strip may have a zig-zag configuration, a sinuous configuration, etc. It should also be noted that each carrier tape 12 and 14 may be provided with a plurality of the barrier strips. As is shown in FIG. 2, the carrier tape 14 is shown with two barrier strips 28 and 29 and it is understood that the other carrier tape 12 would have the same number of barrier strips but only a single barrier strip 27 is shown on the tape 12 for the sake of clarity and brevity.

The method of making the slide fastener chain in accordance with the present invention starts with the two carrier tapes 12 and 14, and the interlocking elements 16 and 18 thereon being engaged into the unitary component forming the chain. A continuous chain is moved or fed at a uniform speed under suitable tension to assure that the chain is maintained in a taut condition without bunching and/or gathering. The movement of the continuous chain is guided so as to conform to the pattern or configuration of the desired barrier strips. During such guided movement, the tape edges 16 and 18 and the interlocking elements 20 and 22 are isolated from adjacent portions of the tapes so as to be precluded from deformation during subsequent steps in the operation. Such adjacent portions of the tapes are now ultrasonically deformed whereby the finished chain is provided with the barrier strips 27 and 28.

The described method of making a slide fastener chain has the particular advantage of not removing any portions of the tapes but merely compacting the textile matrix thereof into an interlocking fabric structure. The simplicity of such method has the further advantage that it may be performed by unskilled labor as well as by an automated operation. Consequently, the cost of manufacturing slide fastener chain according to the present invention has been accomplished in a relatively inexpensive manner.

Figure 6:
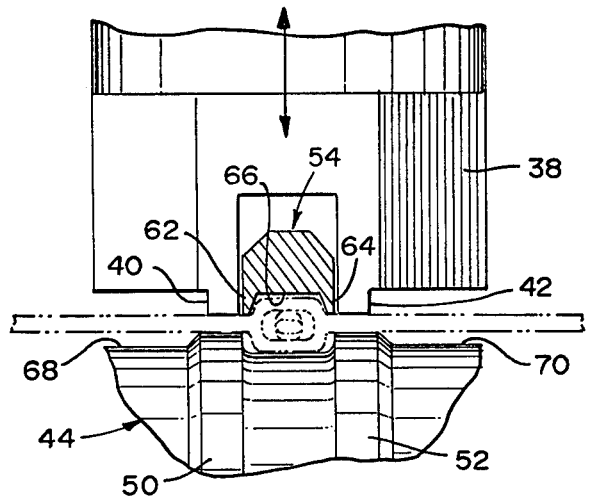
FIG. 6 is a partial elevation view of certain details of FIG. 5.
Figure 7:
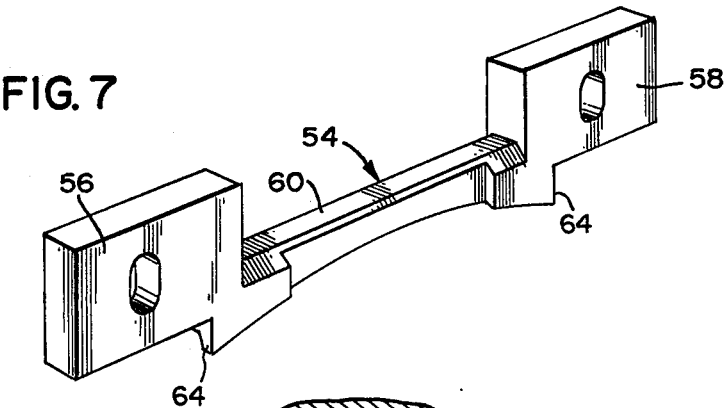
FIG. 7 is a perspective view of a detail of FIGS. 5 and 6.

As is illustrated in FIGS. 5-7, apparatus for making the above described slide fastener chain is indicated generally at 30 and includes a framework 32 supporting an ultrasonic generator 34 which may be of any conventional type. An ultrasonic hammer 36 depends from the generator 34 and terminates in a hammer head 38 including a pair of spaced parallel striking faces 40 and 42 (see FIG. 6). An anvil disposed in cooperating relation with the ultrasonic hammer 36 is formed by wheel 44 which is rotatably in a U-shaped frame 46 by means of an axle 48 that is rotated by any suitable motor means (not shown).

A pair of parallel anvil surfaces 50 and 52 extend around the periphery of the wheel 44 in spaced relation to each other a distance conforming to the distance between the striking faces 40 and 42. A guide member, indicated generally at 54 in FIGS. 5-7, is mounted on the frame 46 by attachment lugs 56 and 58 projecting from opposite ends of an integral connector bar 60. As is apparent from FIGS. 6 and 7, a pair of spaced side walls 62 depend from one side of bar 60 adjacent the lugs 56 and 58, respectively; similarly a second pair of spaced side walls 64 depend from the other side. The side walls 62 and 64 are thus spaced to permit clearance of the tape edges 16 and 18 and the interlocking elements 20 and 22 during movement of the chain. The undersurface of the connecting bar 60 and adjacent parts of side walls 62 and 64 is formed as an arcuate undersurface 66 which is so shaped as to conform to the periphery of the rotating wheel 44.

The mechanism for feeding the chain past the work area may be any type of a movable transport surface, such as a traveling belt, a conveyor mechanism, power driven pulleys, etc., selected in accordance with the requirements of particular apparatus and/or installation thereof. In the apparatus illustrated in FIGS. 5 and 6, the transport surface is shown as the peripheral surfaces 68 and 70 on the rotating wheel 44; these peripheral surfaces 68 and 70 are provided with any suitable arrangement to define high friction surfaces so as to move the chain upon rotation of the wheel 44. As is apparent from FIG. 5, the chain feeding mechanism includes tensioning and idler guiding pulleys 72, 74 and 76 adjustably supported on the frame 46 by mounting arms 78, 80 and 82, respectively.

In the following description of a sequence of operation of the apparatus shown in FIGS. 5–7, it is assumed that first the slide fastener chain is passed around the rollers 72, 74 and 76 and threaded through the work area defined by the anvil and hammering surfaces 50–52 and 40–42, respectively. If desired, the threading operation may be facilitated by means of a spring biased latch for releasing the guide member 54. Accordingly, with the chain being set to proper tension by the rollers, the wheel 44 is rotated at a uniform speed whereby the chain is moved past the work area. Simultaneously with the rotation of wheel 44, the ultrasonic generator 34 is actuated as by a conventional electric switching device (not shown) causing the hammering surfaces 40 and 42 to be reciprocated at a frequency set by the ultrasonic generator 34. During such reciprocation, the hammer head 38 straddles the guide bar 60 without contacting the same so that the hammering surfaces 40 and 42 compact the passing tape portions of the chain against the rotating anvil surfaces 50 and 52, respectively. At the same time the tape edges 16 and 18 and the interlocking elements of the chain are shielded by passing in the spaces between the anvil and hammering surfaces. Accordingly, the tape portions are physically deformed into continuous barrier strips arranged longitudinally with and spaced from adjacent edges of the tapes.

The frequency of the ultrasonic generator 34 and/or the rotating speed of the wheel 44 may be varied in accordance with optimum performance requirements as well as to vary the type and/or pattern of the barrier strips. Plural sets of anvil and hammering surfaces are utilized when multiple barrier strips (e.g. 29 in FIG. 2) are desired. It should also be noted that the ultrasonic generator 34 and/or the rotating wheel 44 may be operated intermittently not only for the purpose of operating performance but also to preselect a particular pattern for the barrier strips.

The apparatus illustrated in FIGS. 5–7 has the particular advantage of high speed operation whereby a large quantity of chain may be manufactured in a relatively short period of time. In addition, the ultrasonic hammer may be reciprocated at high speeds without transmitting vibrations to the chain guide member 54. It should also be noted that vibrations from the ultrasonic hammer are absorbed by the tapes of the chain since the anvil and hammering surfaces do not contact each other but only the tapes therebetween.

Figure 8:
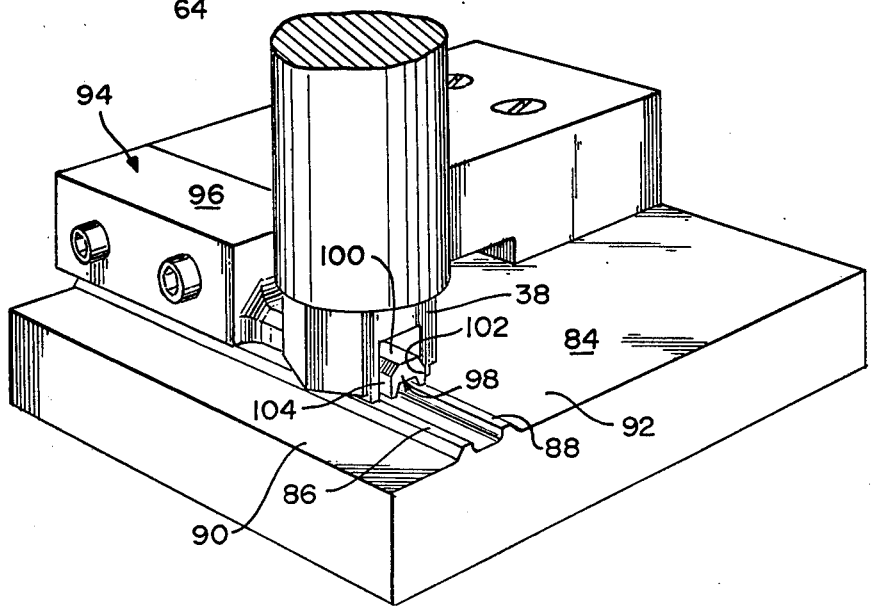
FIG. 8 is a partial perspective view of a modification of the apparatus of FIG. 5.

A modification of the apparatus for making slide fastener chain is illustrated in FIG. 8 wherein an anvil and hammering surfaces do not contact each other but only the tapes therebetween.

A modification of the apparatus for making slide fastener chain is illustrated in FIG. 8 wherein an anvil 84 is a fixed flat plate from which a paor of spaced parallel anvil surfaces 86 and 88 project transversely. Outer surfaces 90 and 92 on the anvil 84 are generally smooth to facilitate chain movement thereover; in this instance the chain is fed over such surfaces by any suitable drive means (not shown). The guide member 94 includes a mounting end 96 for attachment to a remote portion of the anvil 84. The guide member has a rectilinear undersurface 98 and a top wall 100 with depending side walls 102 and 104.

The operation of the apparatus shown in FIG. 8 is substantially the same at that described above in connection with FIGS. 5–7 and is not being described again for the sake of brevity.

Inasmuch as the present invention is subject to many modifications, variations and changes in details, it is intended that all matter contained in the foregoing description or shown on the accompanying drawings shall be interpreted as illustrative and not in a limiting sense.

I claim:

1. Apparatus for making slide fastener chain of the type having a pair of tapes with adjacent edges engaged by interlocking elements comprising
   anvil surfaces, hammering surfaces in opposed relation to said anvil surfaces and being movable relative thereto,
   a transport surface adapted to move a chain between said anvil and hammering surfaces,
   a guide member adapted to guide the chain during its movement, and
   a drive device reciprocating said hammering surfaces relative to said anvil surfaces whereby portions of the chain tapes are compacted between said hammering and anvil surfaces.

2. Apparatus as claimed in claim 1 wherein said drive device includes an ultrasonic generator.

3. Apparatus as claimed in claim 2 wherein said anvil surfaces comprise a pair of anvil surfaces in spaced relation to each other, and wherein said hammering surfaces comprise a pair of hammering surfaces spaced from each other by a space equal to that between said anvil surfaces.

4. Apparatus as claimed in claim 3 wherein said spaces between said anvil surfaces and said hammering surfaces define a shield adapted to shield portions of the chain during reciprocation of said hammering surfaces.

5. Apparatus as claimed in claim 4 wherein said pair of anvil surfaces project transversely from a fixed support plate.

6. Apparatus as claimed in claim 4 wherein said pair of anvil surfaces project transversely from a rotatable support element.

7. Apparatus as claimed in claim 6 wherein said rotatable support element comprises a rotatably driven wheel and said pair of anvil surfaces are located on the periphery of said wheel.

8. Apparatus as claimed in claim 7 wherein said transport surface is located on the periphery of said wheel.

* * * * *